US009361396B2

(12) United States Patent
Fox et al.

(10) Patent No.: US 9,361,396 B2
(45) Date of Patent: Jun. 7, 2016

(54) ADAPTATION OF DISPLAY PAGES FOR CLIENT ENVIRONMENTS

(75) Inventors: Craig Fox, Redmond, WA (US); Meyyappan Meenakshisundaram, Sammamish, WA (US); Hitesh Jawa, Bothell, WA (US); Chad Waldman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1853 days.

(21) Appl. No.: 12/024,000

(22) Filed: Jan. 31, 2008

(65) Prior Publication Data

US 2009/0199080 A1 Aug. 6, 2009

(51) Int. Cl.
G06F 17/00 (2006.01)
G06F 17/30 (2006.01)
G06F 17/21 (2006.01)
G06F 17/22 (2006.01)
G06F 9/44 (2006.01)

(52) U.S. Cl.
CPC ............ *G06F 17/30905* (2013.01); *G06F 8/38* (2013.01); *G06F 17/211* (2013.01); *G06F 17/2264* (2013.01)

(58) Field of Classification Search
CPC ............ G06F 17/30905; G06F 17/211; G06F 17/2264; G06F 8/38
USPC .......... 715/273, 276, 277, 234, 238, 205, 255
See application file for complete search history.

(56) References Cited

U.S. PATENT DOCUMENTS

| 5,627,960 | A  |   | 5/1997  | Clifford et al. |
|-----------|----|---|---------|-----------------|
| 5,745,109 | A  |   | 4/1998  | Nakano et al.   |
| 6,101,510 | A  |   | 8/2000  | Stone et al.    |
| 6,286,104 | B1 | * | 9/2001  | Buhle et al. ........................ 726/4 |
| 6,463,440 | B1 | * | 10/2002 | Hind ................... G06F 17/2247 707/758 |
| 6,801,227 | B2 |   | 10/2004 | Bocionek et al. |
| 7,039,872 | B1 |   | 5/2006  | Raheman         |
| 7,055,097 | B1 | * | 5/2006  | Netsch ............. G06F 17/30905 707/E17.121 |

(Continued)

FOREIGN PATENT DOCUMENTS

WO    WO-2004012081    2/2004

OTHER PUBLICATIONS

"Tigra Menu Builder Win32," http://www.hotscripts.com/Detailed/31018.html [last accessed Oct. 15, 2008], 2 pages.

(Continued)

*Primary Examiner* — Thu Huynh
(74) *Attorney, Agent, or Firm* — Thomas Marquis; Kate Drakos; Micky Minhas (57) ABSTRACT

An adaptation system adapts a web page, which is developed to be displayed by a web browser, to be displayed by client-side code of an application. When a web server receives a request for a web page, it determines whether the request was sent from a client device executing client-side code or from a non-client device executing a browser. If the request is from a client, then the web server uses the adaptation system to adapt the web page to the environment of the application. The adaptation system may modify the web page so that the menus of the web page are not displayed when the web page is displayed within a window of the application. The adaptation system may also modify links of the content of the web page to reference forms of the application, rather than other web pages.

19 Claims, 7 Drawing Sheets

(56) References Cited

U.S. PATENT DOCUMENTS

| | | | |
|---|---|---|---|
| 7,548,957 B1* | 6/2009 | Wichmann et al. | 709/217 |
| 7,577,979 B2* | 8/2009 | Feinleib et al. | 725/114 |
| 7,849,404 B2* | 12/2010 | Tateishi et al. | 715/237 |
| 2001/0016845 A1* | 8/2001 | Tribbensee | 707/10 |
| 2002/0026327 A1* | 2/2002 | Kothari et al. | 705/1 |
| 2002/0083092 A1* | 6/2002 | Simpson | 707/506 |
| 2002/0099739 A1* | 7/2002 | Fischer | 707/515 |
| 2002/0161901 A1* | 10/2002 | Weissman | 709/229 |
| 2003/0237052 A1* | 12/2003 | Danielsson et al. | 715/513 |
| 2004/0075686 A1* | 4/2004 | Watler et al. | 345/749 |
| 2004/0078294 A1* | 4/2004 | Rollins et al. | 705/27 |
| 2004/0205490 A1* | 10/2004 | Haeuptle | 715/501.1 |
| 2005/0172262 A1 | 8/2005 | Lalwani | |
| 2006/0005187 A1 | 1/2006 | Neil | |
| 2006/0036940 A1* | 2/2006 | Hsiu-Ping | G06F 17/30905 715/249 |
| 2006/0248453 A1* | 11/2006 | Bennett et al. | 715/513 |
| 2006/0253801 A1 | 11/2006 | Okaro et al. | |
| 2007/0220107 A1* | 9/2007 | Reisman | 709/217 |
| 2008/0066080 A1* | 3/2008 | Campbell | 719/314 |
| 2008/0120533 A1* | 5/2008 | Lazier et al. | 715/234 |

OTHER PUBLICATIONS

Hennicker, Rolf et al., "Modeling the User Interface of Web Applications with UML," Workshop of the pUML Group, UML2001, Oct. 1, 2001, Toronto, Canada, vol. 7, 15 pages.

* cited by examiner

ADAPTATION OF DISPLAY PAGES FOR CLIENT ENVIRONMENTS

BACKGROUND

Many business applications are developed to operate in a client/server environment. A client/server environment provides a server with server-side code that receives requests from devices executing client-side code. A device that executes client-side code is referred to as a "client." A server typically functions as a central repository of the business data of the business application, which may be stored using a database management system. The client-side code of the application may include various forms to be displayed within windows of the application. The application may use the forms to display data of the application retrieved from the server by the client or for input of data to be sent to the server for storage.

Although the use of client-side code allows for considerable flexibility in developing business applications, users wanting to access a business application may not have access to a computing device with client-side code. For example, a user who is traveling may only have access to a computer that is provided by a hotel. Such a computer typically will not have the client-side code of the application installed. Furthermore, to prevent destructive software or malware from being installed on the computer, the administrator of the computer may have configured the computer to prevent users (e.g., hotel guests) from installing any software on the computer. As a result, a user cannot access the business application from computers other than those under the user's control.

To overcome the requirement of having to access the business application only through a client, some business applications provide a web server interface through which users can access the application via a web browser. Thus, when available, users can use their own computing devices with client-side code installed to access the business application. When, however, a user's computing device is not available, the user can use a browser to access the business application.

To support access by both client devices and non-client devices (e.g., via a browser), business applications typically need to develop web pages, or more generally display pages, that provide functionality similar to the functionality provided by the forms of the client-side code of the business application. The provider of the business application, however, needs to maintain both the forms and the web pages. The need to maintain both forms and web pages with duplicate functionality is both expensive, time-consuming, and error-prone.

To avoid some of this duplicate effort in maintaining both forms and web pages, some business applications may replace some of their forms with web pages. Thus, when a user requests to display a form that has been replaced with a web page, the client-side code sends a request (e.g., HTTP request) for the web page to the web server for the business application. When the web server receives the request, it populates the web page with the business data as appropriate and sends the web page to the client for display using a browser control.

Figure 1:
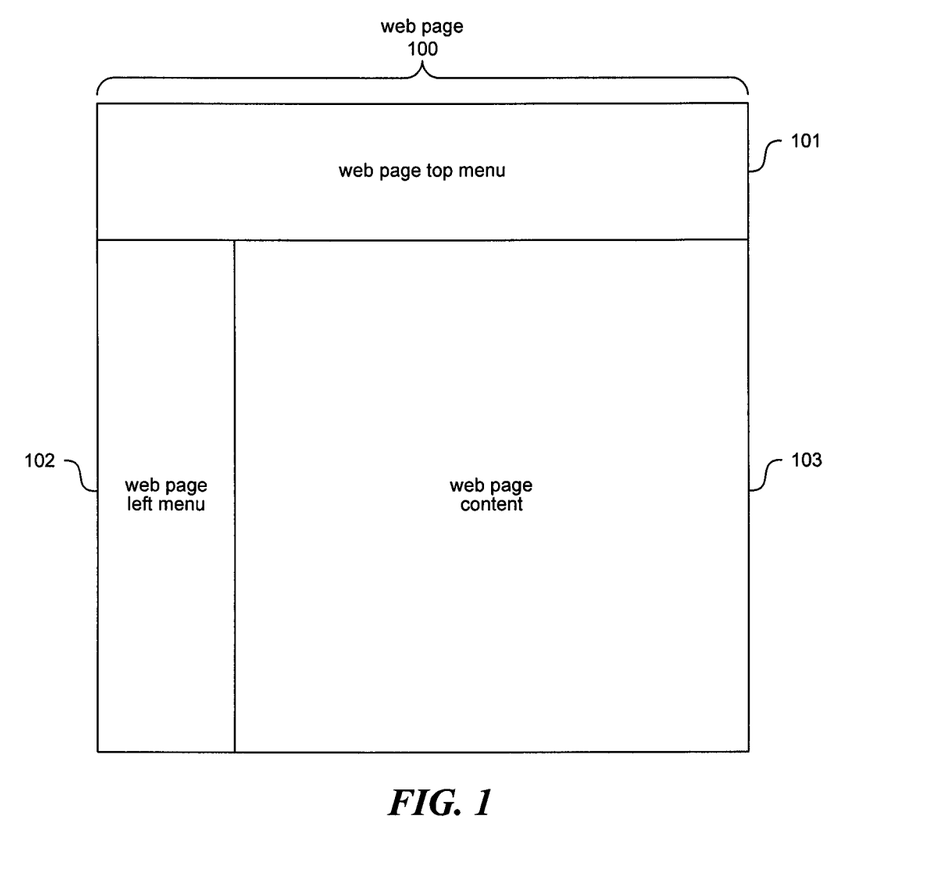
FIG. 1 illustrates the layout of an example web page used by some business applications.

FIG. 1 illustrates the layout of an example web page used by some business applications. A web page 100 includes a top menu area 101, a left menu area 102, and a content area 103. The menu areas typically contain links to other web pages of the business application. The content area may contain business data of the application and static or dynamic links to other web pages. A static link is a link that is statically set by the web server before the web page is delivered to the requesting device. A dynamic link, in contrast, may be set by the web server, but also can be changed by the requesting device. For example, the web page when it is displayed may detect that the user has input a certain value in a field (e.g., preferred language) and may automatically change a dynamic link to reference a different web page based on that value (e.g., to reference a web page in the preferred language).

Figure 2:
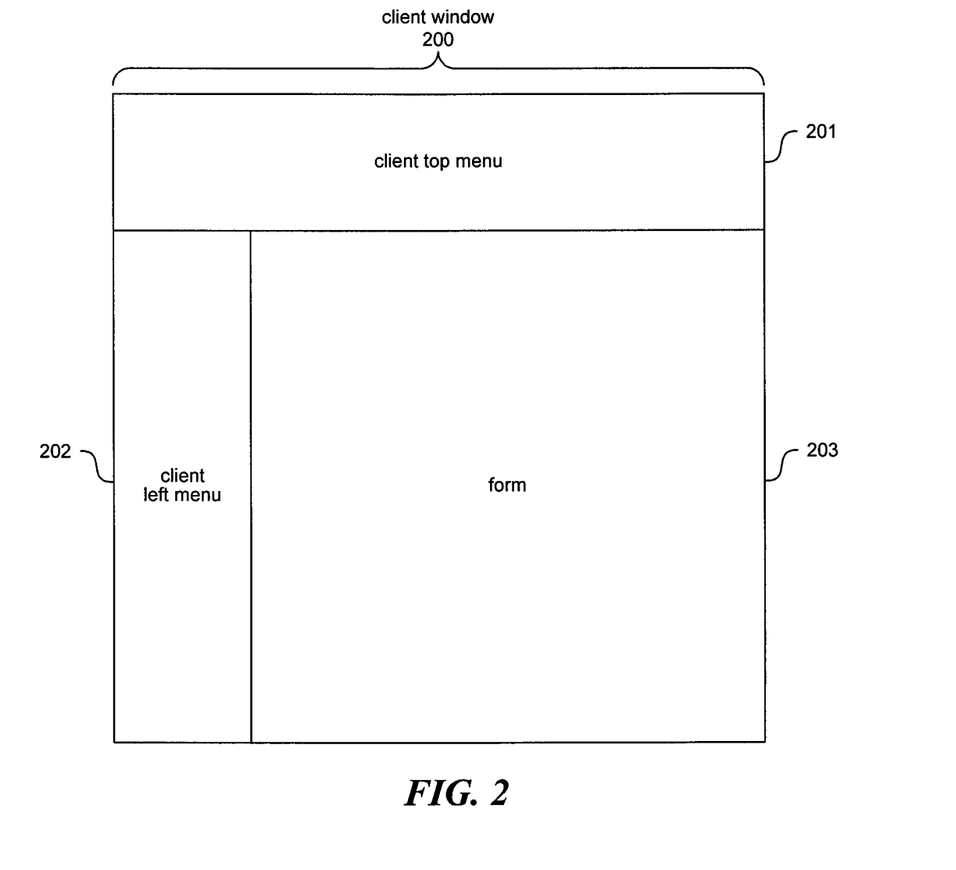
FIG. 2 illustrates the layout of an example window used by some business applications.
Figure 3:
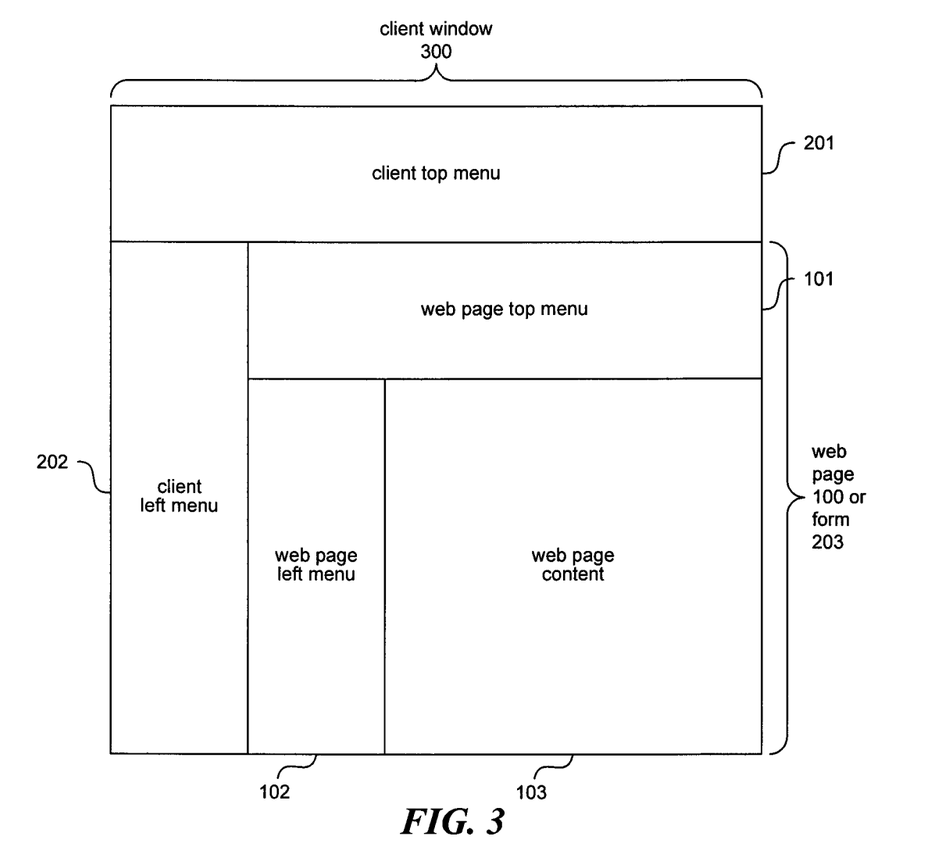
FIG. 3 illustrates the layout of an example window in which a web page has been displayed in the form area.

A difficulty arises, however, when such a web page is displayed by the client within a window of a business application. Business applications generally provide a consistent user interface for windows in which forms are displayed. FIG. 2 illustrates the layout of an example window used by some business applications. A client window 200 includes a top menu area 201, a left menu area 202, and a form area 203. The menu areas typically contain links to other forms of the business application. When a business application replaces a form with a web page, the content of the web page is displayed in the form area of the window. FIG. 3 illustrates the layout of an example window in which a web page has been displayed in the form area. In this example, a client window 300 displays the client top menu area 201 and the client left menu area 202. The form area 203, however, displays the web page 100 with the web page top menu area 101, the web page left menu area 102, and the web page content area 103.

The layout of FIG. 3 can be confusing to users and lead to inconsistent interactions. Users can be confused by the duplicate top menus and left menus. Moreover, the items of the client menus will lead to forms of the applications (which may or may not be implemented as web pages), while the web page menus will lead to other web pages with similar functionality. In certain instances, however, the business application may want to display a form after a web page, rather than another web page. One technique to avoid some of the difficulties may be to develop one web page for display within a window of the application and another web page with similar functionality for display within a window of a browser. Such a technique of maintaining two web pages, however, has similar inefficiencies as described above to the maintaining of both a form and a web page with similarity functionality.

SUMMARY

A method and system for adapting a display page (e.g., a web page) for display within an environment of a client of an application so that the look-and-feel and interactions are consistent is provided. An adaptation system adapts a web page, which is developed to be displayed by a web browser, to be displayed by client-side code of an application. When a web server receives a request for a web page, it determines whether the request was sent from a client device executing client-side code or from a non-client device executing a browser. If the request is from a client, then the web server uses the adaptation system to adapt the web page to the environment of the application. The adaptation system may modify the web page so that the menus of the web page are not displayed when the web page is displayed within a window of the application. The adaptation system may also modify links of the content of the web page to reference forms of the application, rather than other web pages. The adaptation system may also modify the style of the web page to fit within a client window. In this way, the adaptation system can adapt web pages developed for display by a web browser so that they can be displayed within the forms of a business application in a way that tends to avoid user confusion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for adapting a display page for display within an environment of a client of an application is provided. In some embodiments, an adaptation system adapts a web page, or more generally a display page, which is developed to be displayed by a web browser, to be displayed by client-side code of an application. When a web server receives a request for a web page, it determines whether the request was sent from a client device executing client-side code or from a non-client device executing a browser. If the request is from a non-client device, then the web server sends the web page to the device. If, however, the request is from a client, then the web server uses the adaptation system to adapt the web page to the environment of the application. The adaptation system may adapt the web page in various ways. The adaptation system may modify the web page so that the menus of the web page are not displayed when the web page is displayed within a window of the application. For example, the adaptation system may remove the menus before sending the web page to the client or may add code to the web page to remove the menus before displaying the web page at the client. The adaptation system may also modify static links of the content of the web page to reference forms of the application, rather than other web pages. For example, even though the web server may provide a web page corresponding to each form of the application, certain forms may provide a more desirable user experience. In such a case, the adaptation system modifies a static link to a web page to reference the more desirable form. The adaptation system may also cause navigation through dynamic links of a web page to be intercepted at the client and directed to more desirable forms of the application (if they exist) rather than to the dynamically linked web pages. In this way, the adaptation system can adapt web pages developed for display by a web browser so that they can be displayed within the forms of a business application in a way that seamlessly blends and behaves as the client of the application to the user. Instead of maintaining both client forms and equivalent web pages that provide the same business functionality, the adaptation system allows only web pages to be maintained, which eliminates the redundancy of maintenance. The same web pages that are accessible via a browser can be adapted and displayed by a client of the application in a way that will look as if it was a form of the application. Thus, the same web page will be used to support access by a client and a browser.

In some embodiments, the adaptation system further adapts web pages to be consistent with the environment of a window of the application. The adaptation system may adapt the user interface of the web page so that it conforms with the user interface provided by the forms of the application. The adaptation system may modify the fonts, color scheme, menu system, and so on of the web page is to be consistent with those of the application. For example, the adaptation system may adjust the user interface by modifying the style sheets associated with the web page to change the fonts. The adaptation system may also add a refresh button to the web page for refreshing the web page. Since the client displays the web page within a window of the application, the refresh button of the browser is not available. Thus, the added refresh button provides this functionality that is not otherwise provided by a window of the application.

In some embodiments, the adaptation system adapts dynamic links to reference a form corresponding to the web page referenced by the dynamic link, rather than referencing the web page. When the adapted web page is executed at the client, the client intercepts the navigation request and opens the requested form. The client registers to receive event notifications for when a user requests to navigate. When a user requests to navigate, the client is notified of the event. Upon notification, the client cancels the request to navigate and displays the form in place of the web page originally referenced by the dynamic link. In this way, the web page is adapted to replace dynamically linked web pages with forms of the client.

In some embodiments, the web server may provide different web pages to users depending on the roles (e.g., executives, supervisors, or team members) of the users as provided by the business application. Each user may have a home web page that is defined by the user's role. When a user logs in to a business application and attempts to access the user's home web page, the web server selects a web page that is appropriate to the user's role. In some embodiments, the adaptation system may be used in conjunction with a SHAREPOINT Products and Technologies provided by MICROSOFT Corporation.

Figure 4:
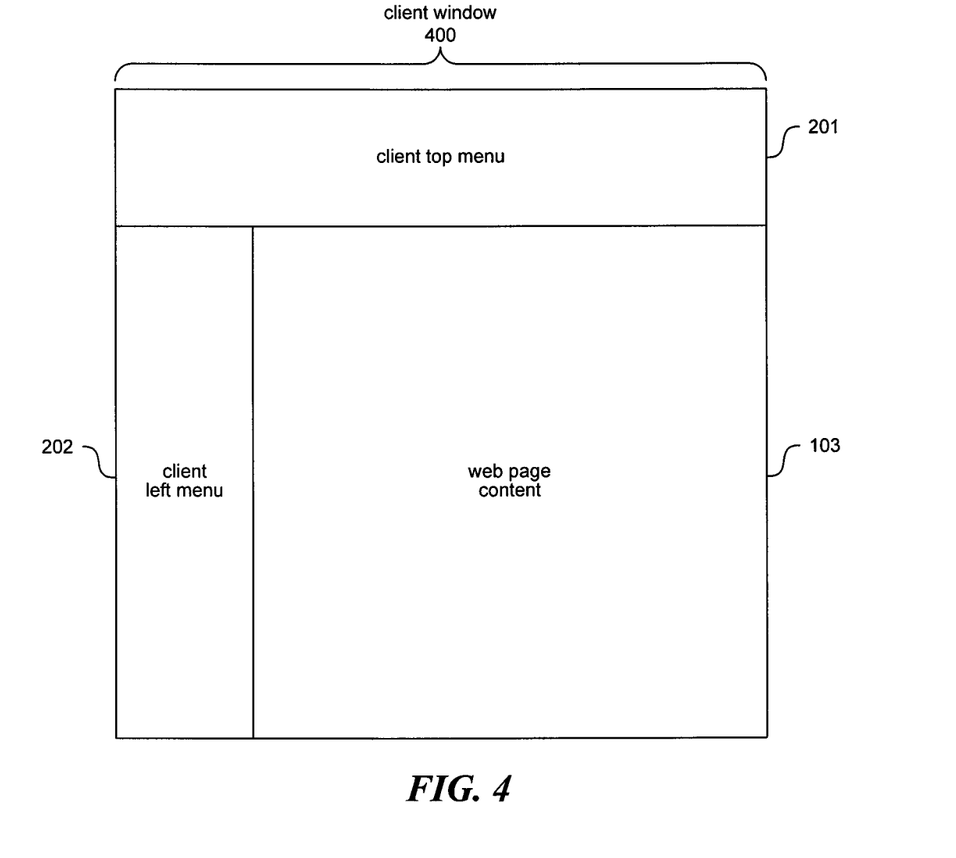
FIG. 4 illustrates the layout of a web page displayed within a window of an application in some embodiments.

FIG. 4 illustrates the layout of a web page displayed within a window of an application in some embodiments. A client window 400 includes the client top menu area 201, the client left menu area 202, and the web page content area 103. The client window, however, does not include the web page top menu area 101 or the web page left menu area 102 as illustrated by FIG. 1. Rather, the adaptation system caused the menus of the web page to be removed before the web page was displayed. Thus, only the client menus are displayed, which avoids user confusion resulting from the display of both client menus and web page menus within the same window of the application.

Figure 5:
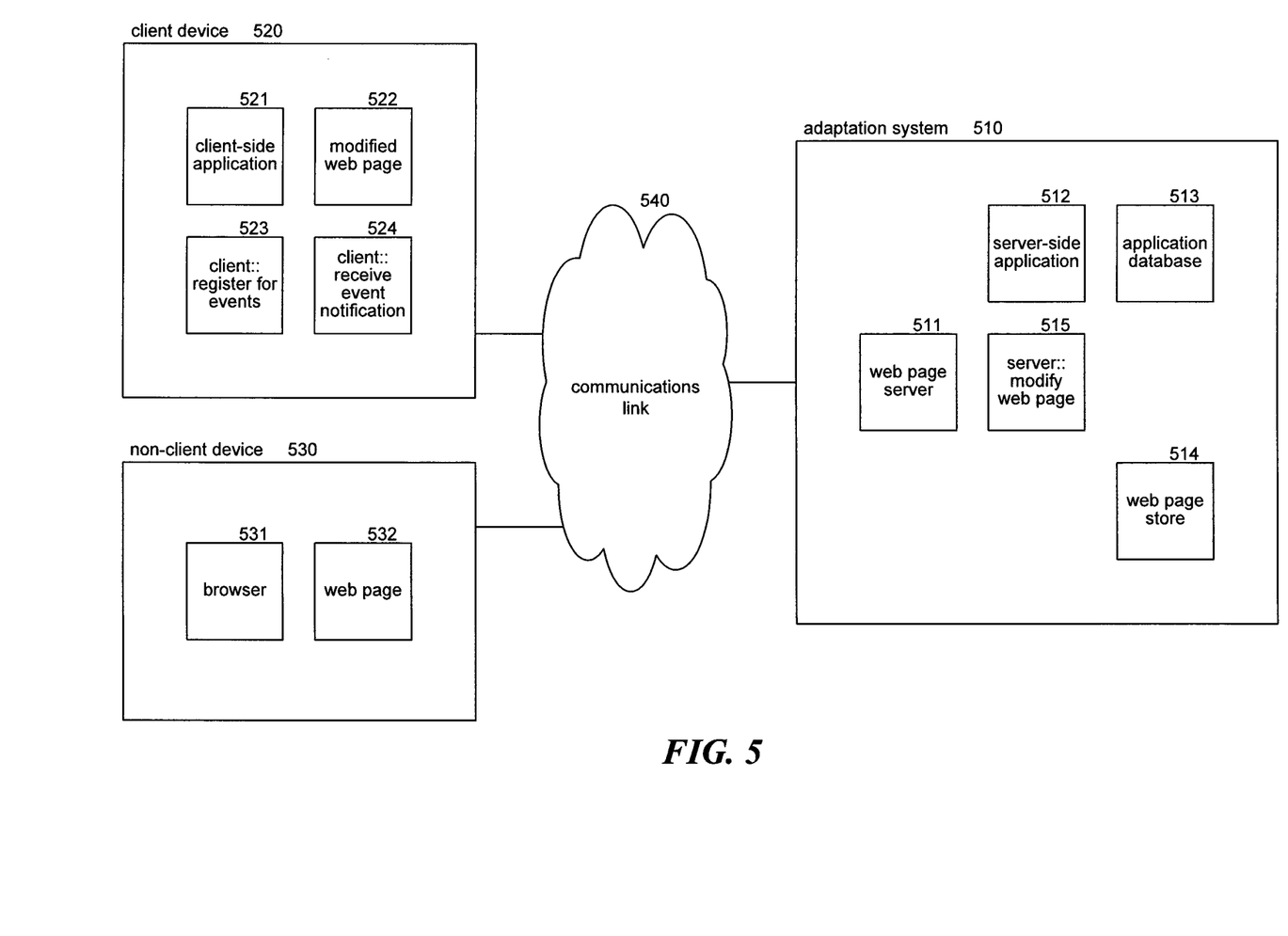
FIG. 5 is a block diagram that illustrates components of the adaptation system in some embodiments.

FIG. 5 is a block diagram that illustrates components of the adaptation system in some embodiments. The adaptation system 510 is connected to a client device 520 and a non-client device 530 via communications link 540. The adaptation system is implemented on a web server of the application that includes a web page server component 511, a server-side application component 512, an application database 513, a web page store 514, and a server-side modify web page 515 component. The web page server component receives requests for web pages and retrieves the requested web page from the web page store. The retrieved web page may have server-side code that retrieves business data via the server-side application from the application database for populating the web page. The web page server component may invoke the server-side modify web page component to adapt the web page when the web page is requested by a client. The web page server component then provides the adapted web page to a client device or a non-adaptive web page to a non-client device.

The client device may include a client-side application component 521, a modified web page 522, a client-side register for events component 523, and a client-side receive event notification component 524. The register for events component associated with a modified web page registers to receive event notifications of user requests to navigate to a web page referenced by a dynamic link of the web page. The receive event notification component is invoked when a registered event occurs. The receive event notification component identifies a form corresponding to the web page referenced by a dynamic link and displays the identified form rather than the referenced web page.

A non-client device may include a web browser 531 and a web page 532. When a user requests a web page via the browser from the web server, a request is sent from the non-client device to the web server. The web server identifies that the web page is being requested by a non-client device via a browser, retrieves the requested web page, and provides the requested web page to the non-client device without adapting the web page to the environment of the application.

The computing device on which the adaptation system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the adaptation system, which means a computer-readable medium that contains the instructions. In addition, the instructions, data structures, and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the adaptation system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The adaptation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, some or all the adaptation of a web page may be performed by the web server, by a client, or by a combination of the web server and a client.

Figure 6:
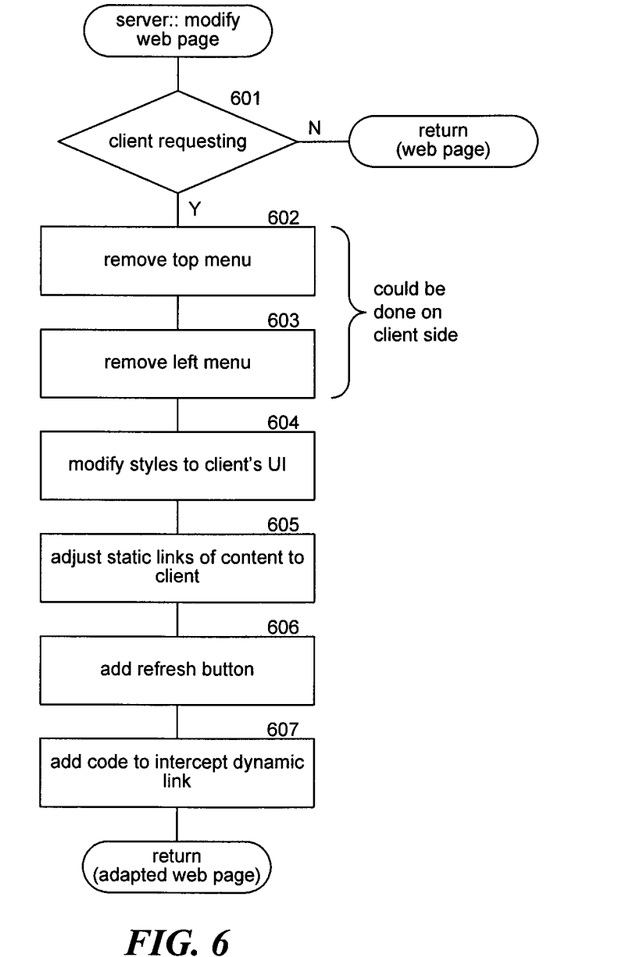
FIG. 6 is a flow diagram that illustrates the processing of the server-side modify web page component of the adaptation system in some embodiments.

FIG. 6 is a flow diagram that illustrates the processing of the server-side modify web page component of the adaptation system in some embodiments. The component is invoked by the web page server component when a requesting device requests a web page that can be adapted to the application environment. In decision block 601, if a client is requesting the web page, then the component continues at block 602, else the component returns so that the web page without adaptation can be provided to the non-client device. In blocks 602-603, the component removes the top menu area and the left menu area from the requested web page. In some embodiments, the component may add code to the web page to remove the menu areas at the client before the web page is displayed. In block 604, the component modifies the styles of the web page to conform with the user interface of the windows provided by the application. In block 605, the component adjusts the static links of the content area of the web page to reference forms of the application as appropriate. In block 606, the component adds a refresh button to the web page. In block 607, the component adds codes to intercept navigations through dynamic links and replace them with navigations to forms of the application. The component then returns so that the adapted web page can be provided to the client.

Figure 7:
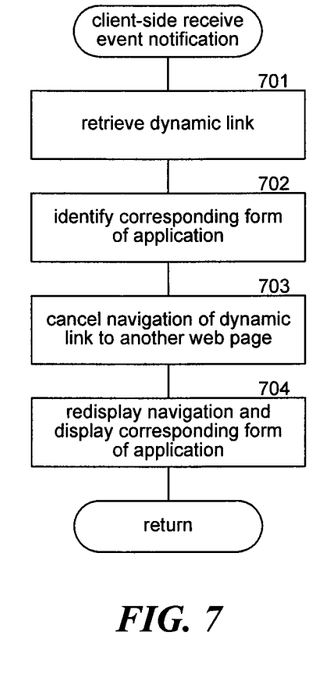
FIG. 7 is a flow diagram that illustrates the processing of the client-side receive event notification component of the adaptation system in some embodiments.

FIG. 7 is a flow diagram that illustrates the processing of the client-side receive event notification component of the adaptation system in some embodiments. The component is invoked when a user attempts to navigate through a dynamic link for which an event notification has been registered. The component cancels the requested navigation and replaces it with a navigation to a corresponding form of the application. In block 701, the component retrieves the dynamic link. In block 702, the component identifies the form corresponding to the web page currently referenced by the dynamic link. In block 703, the component cancels the navigation to the dynamic link. In block 704, the component displays the corresponding form and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for adapting a display page to an environment of an application, the method comprising:
    receiving a request for a display page to be displayed to a user, the display page having a menu and content with a static link and a dynamic link;
    determining whether the request is received from client-side code of the application or a browser of a requesting device;
    when it is determined that the request is received from the client-side code of the application,
        modifying the display page so that the menu is not displayed when the display page is displayed within a window of the application at the requesting device;
        modifying style elements of the display page;
        modifying the static link of the display page to point to a form of the application;
        modifying the display page so that a request to navigate using the dynamic link is intercepted at the requesting device and replaced with a navigation to a form of the application; and
        sending the display page with the modifications to the requesting device; and
    when it is determined that the request is received from the browser, sending the display page to the requesting device.

2. The method of claim 1 wherein when the client-side code displays the display page in a window of the application, the menu of the display page is not displayed and requests to navigate using dynamic links are intercepted.

3. The method of claim 1 further including when it is determined that the request is received from the client-side code of the application, modifying the display page so that a refresh button is displayed when the display page is displayed.

4. The method of claim 1 further including when it is determined that the request is received from the client-side code of the application, modifying the display page so that it appears to conform to the user interface of the application.

5. The method of claim 4 including setting style sheets for the display page so that it appears to conform to the user interface of the application.

6. The method of claim 1 wherein when a user with a role defined by the application requests the display page, adding content to the display page that is specific to the role of the user.

7. The method of claim 1 wherein the modifying of the display page so that a request to navigate using a dynamic link is intercepted at the requesting device includes canceling the request to navigate.

8. The method of claim 1 wherein the computing device does not store a separate display page for requests from the client-side code and for requests from browsers of requesting devices.

9. A computer-readable storage medium that is not a propagating signal containing instructions for controlling a computing device to adapt a display page to an environment of a client of an application, the client executing client-side code of the application, the display page being a web page, by a method comprising:

receiving from a requesting device a request for the display page to be displayed, the display page having a menu and content with links;

determining whether the request is from client-side code of the application executing at the requesting device, the client-side code not being a browser;

when it is determined that the request is not received from the client-side code of the application, sending the display page without modifications to the requesting device; and when it is determined that the request is received from the client-side code of the application executing at the requesting device, modifying the display page to effect removal of the menu;

modifying the display page to display forms of the application in place of display pages referenced by the links; and sending to the requesting device the display page with the modifications so that the client-side code can display the display page with the modifications.

10. The computer-readable storage medium of claim 9 wherein the modifying of the display page includes:

modifying the display page so that the menu is not displayed when the display page is displayed within a window of the application at the client;

modifying static links to point to forms of the application;

modifying the display page so that a request to navigate using a dynamic link is intercepted at the client and replaced with a navigation to a form of the application; and modifying the display page so that it appears to conform with the user interface of the application.

11. The computer-readable storage medium of claim 10 wherein the modifying of the display page so that a request to navigate using a dynamic link is intercepted at the client includes canceling the request to navigate.

12. The computer-readable storage medium of claim 9 wherein the modifying of the display page includes adding to the display page an indication of the form.

13. The computer-readable storage medium of claim 9 wherein when the client displays the display page in a window of the application, the menu of the web page is not displayed and requests to navigate using dynamic links are intercepted.

14. The computer-readable storage medium of claim 9 further including when it is determined that the request is received from client-side code of the application, modifying the display page so that a refresh button is displayed when the display page is displayed.

15. The computer-readable storage medium of claim 9 wherein the computer-readable storage medium is a computer-readable storage device wherein the computing device does not store a separate display page for requests from the client-side code and for requests from browsers.

16. A computing device for adapting display pages to an environment of an application, the display pages being web pages, the computing device comprising:

a computer-readable storage medium storing:

a display page store with display pages, each display page having a menu and content with links to other display pages;

a component that determines whether a request for a display page is received from client-side code of the application executing at a requesting device or from a browser executing at the requesting device, wherein the client-side code is not a browser;

a component that modifies the requested display page to effect removal of the menu and modifies the requested display page to display forms of the application that are not web pages in place of display pages referenced by the links when it is determined that the request is received from the client-side code of the application;

a component that sends to the browser of the requesting device the display page without modification to be displayed in an environment of the browser when it is determined that the request is received from a browser; and a component that sends to the client-side code of application executing at the requesting device the display page with modifications to be displayed in the environment of client-side code of the application when it is determined that the request is received from the client-side code of the application; and a processor for executing instructions implementing the components.

17. The computing device of claim 16 wherein the component that modifies the display page modifies the display page so that the menu is not displayed when the display page is displayed within a window of the client-side code of the application;

modifies links to point to forms of the application;

modifies the display page so that a request to navigate using a dynamic link is intercepted by the client-side code and replaced with a navigation to a form of the application that corresponds to the display page referenced by the dynamic link; and modifies the display page so that it appears to conform with the user interface of the application.

18. A computing device for adapting display pages to an environment of a client of an application, the computing device comprising:

a computer-readable storage medium storing:

a display page store with display pages, each display page having a menu and content with links to other display pages;

a component that determines whether a request for a display page is received from a client of the application executing client-side code that is not a browser or a requesting device via a browser; and a component that modifies the requested display page to effect removal of the menu and display of forms of the application in place of display pages referenced by the links when it is determined that the request is received from the client of the application executing the client-side code so that the display page without modification can be displayed in an environment of the browser and with the modification can be displayed in the environment of the client of the application executing the client-side code wherein the modifying of the display page so that a request to navigate using a dynamic link is intercepted at the client and the request to navigate to the display page referenced by the dynamic link is canceled; and a processor executing instructions implementing the components.

19. The computing device of claim 16 wherein the computing device does not store a separate display page for requests from clients and non-clients.

\* \* \* \* \*